(12) United States Patent
Higgins

(10) Patent No.: US 8,101,227 B2
(45) Date of Patent: Jan. 24, 2012

(54) COMPOSITION AND METHODS OF MAKING FROZEN INFANT AND TODDLER FOOD

(75) Inventor: Leighanne Higgins, Grant, MI (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 12/811,042

(22) PCT Filed: Dec. 31, 2008

(86) PCT No.: PCT/US2008/014121
§ 371 (c)(1),
(2), (4) Date: Sep. 9, 2010

(87) PCT Pub. No.: WO2009/085316
PCT Pub. Date: Jul. 9, 2009

(65) Prior Publication Data
US 2011/0014349 A1   Jan. 20, 2011

(51) Int. Cl.
*A23K 1/00* (2006.01)
*B02C 23/08* (2006.01)
*A23C 3/00* (2006.01)
*A23L 1/212* (2006.01)

(52) U.S. Cl. ........ 426/615; 426/518; 426/523; 426/524; 426/519; 426/801

(58) Field of Classification Search .................. 426/628, 426/565, 614, 615
See application file for complete search history.

(56) References Cited

U.S. PATENT DOCUMENTS

| | | |
|---|---|---|
| 6,171,634 B1 * | 1/2001 | Marjanovic et al. .......... 426/589 |
| 2005/0037110 A1 * | 2/2005 | Windhab et al. .............. 426/100 |
| 2006/0105095 A1 * | 5/2006 | Anthony et al. .............. 426/615 |

OTHER PUBLICATIONS

"Tastybaby organic frozen food now avaialble" News itenm posted on Sep. 27, 2007 http://www.redorbit.com/news/health/1080723/tastybaby_frozen_organic_baby_food_now_available accessed on Sep. 1, 2011.*

* cited by examiner

*Primary Examiner* — Humera Sheikh
*Assistant Examiner* — Subbalakshmi Prakash
(74) *Attorney, Agent, or Firm* — Gary M. Lobel

(57) ABSTRACT

The present invention is aimed to retain the taste and texture of infant and toddler food products that have been frozen. By employing a slow-churning freezing process, the frozen infant and toddler products are lighter in color, smoother and creamier in texture and possess a better taste profile. The invention further comprises methods of making and using such products.

18 Claims, No Drawings

COMPOSITION AND METHODS OF MAKING FROZEN INFANT AND TODDLER FOOD

FIELD OF THE INVENTION

The present invention relates generally to infant and toddler foods and particularly to frozen infant and toddler foods and methods of preparing these foods.

BACKGROUND OF THE INVENTION

Most of the current frozen purees that are available in the market are made by filling the product into a container as a puree and then frozen therein. When products formed in this manner are thawed, however, the purees have an undesirable, lumpy texture. Naturally, children, as well as adults, find products with such mouth feel and taste characteristics unappealing, and products so sold are not popular.

There is, therefore, a need for an improved technique that permits the freezing of purees and the like without the undesirable characteristics of the prior art. Low temperature freezing, in particular, e.g., slow-churn freezing, has recently been developed in ice cream technology and frozen dessert technology with a finer microstructure of air bubbles and ice crystal size. Applicant has found that using this new process, the frozen product has an improved shelf-life, better mouth feel and is more heat-shock stable. Examples of patent documents that describe the use of this new technology include U.S. Patent Application Publication No. 2008/0254180, International PCT Publication WO/20060/099,987 A1, and U.S. Pat. Nos. 6,596,333 and 6,890,577, all of which are assigned to Nestec, S.A., where each of which is incorporated herein by reference in its entirety.

While the aforementioned techniques have been successfully applied to ice cream and dairy products for the purpose of simulating the presence of fat in a lowfat application, the presence of fat, however, is undesirble in infant and toddler foods.

U.S. Patent Application Publication No. 2007/0048419 (the '419 publication), generally describes a method for producing a frozen food having a texture, which is similar to that in a state before freezing, after defrosting. The flash-freezing method involves immersing at least one food material in an aqueous solution containing 1-5% salt; 2-10 wt % saccharide; and 0.1-0.5 wt % calcium salts; and freezing the immersed food material by passing it through a temperature range of 0 to −50° C. within 15 minutes to reach a temperature range of −20° C. or less. According to the inventors of the '419 publication, by applying the immersing and freezing procedures, the enzyme contained in the food materials are inactivated to retain freshness, and the growth of ice crystals, which is formed with water contained in the food material, is inhibited, thereby preventing tissue breakdown and ultimately retaining the state of the food material before freezing. The duration of freezing the food, however, as set forth in this reference, is short and rapid, i.e., 8-10 min or 12 min or less and is in the range of 0 to −5° C. and the ultimate temperature of the frozen food was −38° C. However, there is no discussion of preparing frozen infant or toddler food using a slow-churning freezing method, such as the one discussed above and proposed herein.

U.S. Patent Application Publication No. 2006/0105095 (now abandoned), generally discusses a process of taking organic and non-organic fruits, vegetables and meats and creating a frozen baby food product without additives or artificial sweeteners included therein. As disclosed, organic or non-organic fruits, vegetables and cooked meats are prepared and then frozen to different consistencies. Portions of the cooked material are frozen into small portions, individually packaged servings or ice-cube like form. Like the '419 publication, this reference also fails to discuss the use of a slow-churning freezing process to freeze toddler, infant or baby food pursuant to the teachings of the present invention.

Therefore, there remains a need for frozen infant and toddler foods that have improved taste and texture, such as in the frozen ice cream technology. The present invention, as discussed hereinbelow, does meet such need.

SUMMARY OF THE INVENTION

The present invention provides frozen infant and toddler products that include a liquid or puree medium, wherein the medium being frozen into small ice crystals by means of a slow-churning freezing process for a predetermined period of time.

The present invention also provides a method of making a frozen infant or toddler product that includes (1) cooking a liquid or puree medium in order to sterilize the contents; (2) stirring the medium for a predetermined period of time by a slow-churned freezing process to form a frozen product; and (3) transferring the frozen product into a sterile container.

In one embodiment, the medium is selected from the group consisting of fruits, vegetables, meats, fish, and any combinations thereof, and the product may be organic or non-organic.

In another embodiment, the slow-churning freezing process is conducted at a freezing temperature of at least about −3° C. to at least about −8° C. and the duration of freezing the products is from at least about 50 min to about 0 min. In addition, the slow-churning freezing process provides at least about 80-90% freezable water fraction at a low temperature.

As used herein, the term "comprise" and variations of the term, such as "comprising," "comprises" and "comprised," are not intended to exclude other additives, components, integers or steps.

The term "about," as used herein, should generally be understood to refer to both numbers in a range of numerals. Moreover, all numerical ranges herein should be understood to include each whole integer within the range. Throughout this application, the term "about" is also used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

The terms "a" and "an," when used in conjunction with the word "comprising" in the claims or specification, denotes one or more, unless specifically noted.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

DETAILED DESCRIPTION OF THE INVENTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

It would be helpful to first set forth some definitions of terms employed in the present invention, providing some guidance in describing the advances of the instant innovation and increasing awareness of the benefits thereof.

"Toddler" means a child from the age of one to five years of age.

"Infant" means a child up to the age of one year.

As used herein, a "medium" may be in form of liquid or a puree.

The term "puree" refers to any of the food product that is mashed, grounded, whipped, chopped or being processed in any suitable method needed to obtain an appropriate consistency that is safe for consumption by small children.

It should be understood that the source of the frozen product may be organic or non-organic materials.

The term "product," as used herein, refers to compositions including fruits, vegetables, meats, fish and any of the combinations thereof. The product or combinations of the products may be cooked by boiling, baking, steaming, broiling, sautéing, or by any other suitable cooking methods. As indicated, a main concern for the cooking is to remove unwanted and harmful bacteria or other such unwelcome organisms.

Brix (symbol °Bx) is a measurement of the dissolved sugar-to-water mass ratio of a liquid, and is measured with a saccharimeter that measures specific gravity of liquid or more easily with a refractometer. A °Bx solution is 25% (w/w), with 25 grams of sugar per 100 grams of solution, which is equivalent to 25 grams of sucrose sugar and 75 grams of water in the 100 grams of solution. It is used in the food industry for measuring the approximate amount of sugars in fruits, vegetables, juices, wine, soft drinks, etc. It should be understood to one of skill in the art that in some countries, the measurement scales may be in terms of specific gravity, Plato degrees, degrees Baumé, or °Bx or a mixture of anyone of these. Since Brix is related to the concentration of solids (mostly sucrose) in a fluid, it is related to specific gravity of the liquid and, therefore, can be measured by refractometers. Modern Brix meters are digital refractometers that calculate the Brix value based on refractive index. The acceptable ranges for Brix values used in the present inventions are proprietary to the Applicant.

The term "titratable acidity (TA)," of fruit juices, as used herein, refers to the measurement of titratable hydrogen ions, contained in fruit juices samples, by neutralization with strong base solution at fixed pH. TA value includes all the substances of an acidic nature in the fruit juice: free hydrogen ions, organic acids, acid salts and cations. Since organic acids are the most acidic component of the fruit juices that react with strong bases solutions, the TA is usually expressed as g/L or g/100 mL (%) of the predominant acid contained. Examples of predominant acids in fruit juices are tartaric acid, citric acid and malic acid. Based on a sample temperature ranging from 0-35° C. (32-95° F.), the TA of different fruit juices are as follows:

| Fruits Juices | Titratable Acidity (g/100 mL) | Predominant Acid |
| --- | --- | --- |
| Apple, Pear | 0.36-0.80 | Malic Acid |
| Cranberry | 1.6-3.6 | Citric Acid |
| Grapefruit | 1.2-2.0 | Citric Acid |
| Lemon, Lime | 4.0-6.2 | Citric Acid |
| Mango | 0.34-0.84 | Citric Acid |
| Orange, Tangerines | 0.80-1.4 | Citric Acid |
| Peach, Nectarine Sweet Cherry | 0.24-0.94 | Citric Acid |
| Pineapple | 0.70-1.60 | Citric Acid |
| Plum/Sour Cherry | 0.94-1.64 | Malic Acid |
| Strawberry | 0.60-1.10 | Citric Acid |
| Table Grape | 0.40-0.90 | Tartaric Acid |
| Tomato | 0.34-1.00 | Citric Acid |

The range of TA, as employed by the present invention, is from at least about 0.1 to at least about 1.2%. In one embodiment, the TA ranges from at least about 0.2-0.8%.

The temperature for freezing the liquid or pureed medium to obtain the frozen product may range from at least about −3 to −8° C.

Ambient temperature, also refers to as room temperature, refers to a certain temperature that ranges from at least about 18° C. (64.4° F.) to at least about 28° C. (82.4° F.).

The duration for freezing the liquid or pureed medium may range from at least about 50 to 60 min with the significant generation of air bubbles at about 30 min (specific for Lello Gelato Pro).

Using the slow-churned freezing process, the percent of freezable water fraction at the low temperature ranges from at least about 80-90%.

The present invention provides frozen infant and toddler foods that have improved taste and texture even though frozen by virtue of the proposed slow-churning process set forth herein in more detail.

As is understood to one of skill in the art, the slow-churned freezing process could be applied to any liquid or puree medium and could include fruit, vegetable, or meat purees or any combination, as well as include juices and yoghurt. The present invention entails slowly freezing a liquid or puree medium in order to make the ice crystals smaller and provide a more appealing appearance and texture to the consumer when the product is thawed out/reheated. A puree that was slow frozen has smaller ice crystals, which resulted in a smoother looking puree that had more visual appeal than the control product that was frozen in its original container. Applicant unexpectedly also found that the slow-churned frozen product was lighter in color, had a smoother, creamier texture and a better taste profile than the control product.

One object of the present invention is to utilize a puree (fruit, vegetable, a blend of these purees, and other meat-containing meals) that has been cooked or rendered commercially sterile, then have the product cooled and frozen using a process that would generate small ice crystals, i.e., the instant slow-churning process, and filled into an appropriate container that can be frozen and sent to the customer/consumer.

In one embodiment, a countertop ice cream freezer (e.g., Lello Gelato Pro II) may be used to freeze the liquid or puree medium. This freezer is a metal container that is placed in the freezing unit. The puree is placed in the unit but not filled to the top to account for potential overrun. A stirring arm that scrapes the sides of the freezing container is then placed in the puree in the container and the motor is attached to the stirring arm. The timing apparatus is set, for example, for 30-45 minutes depending on the puree in the unit. It should be understood that the set time is dependent on the sugar/solids content of the puree. The frozen puree is complete when the unit can no longer freely turn, i.e., the viscosity of the composition is too great. For some products it is necessary to stop the machine and stir the product so that then material on the inside of the metal container gets to the outside of the container.

The term "predetermined period of time," as used herein, refers to a set time for slow stirring or churning the product until it becomes frozen and where the stirring blade can no longer rotate. The set time is dependent of the sugar/solids content of the liquid or puree medium and also on the type of food product.

The speed of the stirring arm, as used in the Lello Gelato Pro II, may be at least at about 20-30 revolutions per minute (rpm), e.g., at a rate of 26 rpm.

Fruit products for use in the present invention and as employed in various tests set forth hereinbelow include bananas, peaches, pears and prunes. Presently-preferred equipment for practicing the principles of the present ivnention include a Lello Gelato Pro Model 4090 (Serial No. 0207A), Oakton Acorn Temp 6 RTD Thermometer and Master Bilt Freezer (−20 F). Freezing of the tested products in the tests described herein were conducted in duplicate. Other freezing equipment that has a pre-frozen bowl or has an internal freezing mechanism that has a set point of −24° C. may also be used in the present invention.

One embodiment of the present invention may include the following procedural steps:

a. Placing 1584 g (sixteen 99 g-cups) of product (e.g., bananas, peaches, pears) or 1562 g (twenty-two 71 g-cups for prunes) into the Gelato Pro unit
b. Leave one 99 g cup (two 71 g-cups for prunes) at ambient temperature;
c. Freeze one 99 g cup (two 71 g-cups for prunes) "as is" into the freezer;
d. Run the Gelato Pro unit for 10 minutes;
e. Turn chill switch unit off for 5 minutes (to avoid further freezing);
f. As soon as "off", take product temperature (in Centigrade) by inserting the probe vertically into the product midway between blade and outer portion of canister, just above the bottom surface of the canister. Transfer 100 g of product (for prunes, two 70 g units) to the freezer;
g. At 5 minutes of being in "off" position, turn Gelator Pro unit back "on" and resume churning for another 10 minutes
h. When that 10 minutes is complete, repeat steps (e) and (f.). Using a spatula, the portion of the product located at the outer portion or outermost side of the canister is blended into the product near the blade.
i. Continue taking temperatures and product samples, either in 100 g or in two 70 g product, every ten minutes as described previously, with no further mixing of colder product into warmer product
j. Continue the churning step until product is frozen (when blade will no longer rotate).

The following chart illustrates the temperatures of the various compositions during the slow-churning process according to the teachings of the present invention.

| | Temperature (° C.) | | | | | | | |
|---|---|---|---|---|---|---|---|---|
| | PRODUCTS | | | | | | | |
| | BANANAS | | PEARS | | PEACHES | | PRUNES | |
| TIME (mins) | TEST 1 | TEST 2 | TEST 1 | TEST 2 | TEST 1 | TEST 2 | TEST 1 | TEST 2 |
| 10 | 11.8° | 10.9° | 11.4° | 12.1° | 10.8° | 10.0° | 12.7° | 10.8° |
| 20 | 0.8° | −0.2° | 1.0° | 0.9° | 0.3° | 0.9° | 1.1° | 0.3° |
| 30 | −2.6° | −2.8° | −1.6° | −1.6° | −1.8° | −1.9° | −3.3° | −3.4° |
| 40 | −3.3° | −3.3° | −2.0° | −1.9° | −2.4° | −2.3° | −4.1° | −3.9° |
| 50 | −4.1° | −4.1° | −2.6° | −2.5° | −2.6° | −3.8° | −4.9° | −4.8° |
| 60 | −5.0° | −6.2° | −3.3° | −3.1° | −4.0° | −4.2° | −6.3° | −6.9° |

As noted, at 60 minutes, the product was substantially frozen with no further churning possible.

The principles of the present invention were tested in various procedures as described in detail hereinbelow, which set forth the parameters employed and the results.

EXAMPLE 1

TITRATABLE ACIDITY AND BRIX VALUES
OF FROZEN PEARS AND PEACHES

| | Pears | | Peaches | |
|---|---|---|---|---|
| Conditions | T.A. | Brix | T.A. | Brix |
| Ambient | 0.32 | 12.13 | 0.72 | 15.23 |
| Frozen | 0.32 | 11.99 | 0.72 | 15.13 |
| 10-minute Gel | 0.32 | 11.99 | 0.71 | 15.15 |
| 20-minute Gel | 0.32 | 12.23 | 0.72 | 15.29 |
| 30-minute Gel | 0.32 | 12.09 | 0.72 | 15.28 |
| 40-minute Gel | 0.31 | 12.04 | 0.71 | 15.22 |
| 50-minute Gel | 0.31 | 12.31 | 0.72 | 15.47 |
| 60-minute Gel | 0.31 | 12.03 | 0.71 | 15.17 |

EXAMPLE 2

| PROD/CODE NO DATE PACKED | COLOR/HUE | APPEARANCE/ CONSISTENCY | FLAVOR/ AFTERTASTE | TEXTURE/ MOUTHFEEL | ACCEPT./ COMMENTS |
|---|---|---|---|---|---|
| \multicolumn{6}{c}{SENSORY CUTTING EVALUATION PRODUCTS: Frozen Purees} | | | | | |
| Bananas | Pink | More visible fibrous chunks, sticky | Acidic Banana Sweet/acid after | Slightly thick Melts fast | |
| Bananas Slow churned | Light Tan slightly pink | Visible small grain-like Slightly thinner Less sticky | Milder Sweet Banana Acid after less intense | Slightly thick Melts fast | Better product all attributes |
| Oatmeal with apple and banana | Light brown with red notes | More visible fibrous thick | Sweet Apple Acid Grain | Thick Pulpy in mouth | Better product flavor |
| Oatmeal with apple and banana Slow churned | Light brown with grey notes | Less visible fibers Slightly less thick | Milder less tart Sweet, apple Odd note like apple skin or possibly floury from grains | Slightly thick Less noticeable pulp Thick smooth mash | |
| Sweet Potatoes | Darker orange | Thick Smooth | Sweet potato, low sweet | Thick smooth | Different varieties of sweet potatoes |
| Sweet Potatoes Slow churn | Lighter orange | Thick Smooth | Odd potato flavor Green | Thinner Smooth | |
| Chicken Noodle | Darker yellow/brown | Thicker Visible fiber | Celery Chicken fat Vegetable Slight sweet | Thick | |
| Chicken Noodle Slow churned | Lighter yellow/brown | Thinner Less fiber | More vegetable Less chicken | Thinner | Better product, more rounded flavor, less chicken/chicken fat notes |

Results: Definite differences in color, appearance, flavor, consistency, and mouth feel with frozen food products using slow-churning freezing process

EXAMPLE 3

| PROD/CODE NO DATE PACKED | COLOR/HUE | APPEARANCE/ CONSISTENCY | AROMA | FLAVOR/ AFTERTASTE | TEXTURE/ MOUTHFEEL | ACCEPT./ COMMENTS |
|---|---|---|---|---|---|---|
| \multicolumn{7}{c}{SENSORY CUTTING EVALUATION PRODUCTS: Slow Churned Purees-2nd Foods} | | | | | | |
| Green Beans Ambient | All three samples similar color Dark green | Skin on top of puree Smooth Thin | Typical Green bean | Strong green bean Very bitter AT | Smooth Thin | |
| Green Beans Frozen | All three samples similar color Dark green | Thick spongy skin on top of puree Entire puree was like a hard sponge Texture never returned to smooth upon heating | Typical Green bean | Blander, less intense green bean flavor Lower bitter note | Spongy Chewy Watery | Texture issues Freezing lowered bitter notes-somewhat improved flavor-lower green bean flavor |
| Green Beans Slow churned | All three samples similar color Dark green May have been slightly lighter in color | Appeared whipped before stirring Water separation evident Looks like oil in water Flocculated Very unpleasant texture | Typical Green bean | Sweet up front Less intensity of green bean flavor Canned green bean flavor Flat flavor | Spongy Chewy Watery | Texture issues Freezing lowered bitter notes-somewhat improved flavor-lower green bean flavor |
| Carrots Ambient | Darker orange | Texture appeared similar | Salty Sweet AT Carrot flavor | Thin Watery | | |

-continued

SENSORY CUTTING EVALUATION
PRODUCTS: Slow Churned Purees-2nd Foods

| PROD/CODE NO DATE PACKED | COLOR/HUE | APPEARANCE/ CONSISTENCY | AROMA | FLAVOR/ AFTERTASTE | TEXTURE/ MOUTHFEEL | ACCEPT./ COMMENTS |
|---|---|---|---|---|---|---|
| Carrots Frozen | Darker orange than ambient | Corners of product look like water separation occurred Texture appeared similar | Increased sweet Different flavor notes- could not identify | Thin | | |
| Carrots Slow churned | Brighter, lighter orange color | Texture appeared similar | Sweeter Less carrot flavor | Smooth Melts fast | Thicker product | Appeared to have less bitter carrot notes, but also less carrot flavor, improved color |
| Peaches Ambient | Light color | Thin Watery | | Tart Very bitter AT | Thin | |
| Peaches Frozen | Darker color than ambient | Thicker-cold vs. ambient Appeared less fibrous | | Milder flavor Less tart Less bitter Still somewhat bitter | Slightly thicker than ambient | |
| Peaches Slow churned | Lighter paler color vs. ambient and frozen | Whipped appearance Cup was much fuller with 99-100 g | | Very different flavor Very fruity Less bitter/tart Increased sweetness | Light, whipped, easier to move in mouthy, did not melt as fast | Improved flavor, different texture and mouth feel, different color and appearance |
| Bananas Ambient | Typical banana color Shiny | | | Strong banana flavor | Thick Smooth | |
| Bananas Frozen | Slightly pinker than ambient | Slightly thicker than ambient cold | | Increased sweet Decrease banana flavor Tasted more like real bananas | Thick Smooth | |
| Bananas Slow churned | Lighter color Airy | Whipped appearance | | Fresh Sweet Less intense banana flavor | Fluffy Airy Whipped Easier to clear mouth, melts slower | Improved flavor, different appearance, texture and mouth feel |

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. Frozen infant and toddler food products comprising a liquid or puree medium, the medium being frozen into small ice crystals by means of a slow-churning freezing process over a predetermined period of time, wherein the slow-churning freezing process is conducted at a freezing temperature from at least about −3° C. to at least about −8° C., and wherein the duration of freezing the products is from at least about 50 min to about 60 min.

2. The products according to claim 1, wherein the medium is selected from the list consisting of fruits, vegetables, meats, fish, and any combinations thereof.

3. The products according to claim 1, wherein said products are organic.

4. The products according to claim 1, wherein said products are non-organic.

5. The products according to claim 1, wherein the slow-churning freezing process provides at least about 80-90% freezable water fraction at the temperature from at least about −3° C. to at least about −8° C.

6. The products according to claim 1, wherein said toddler is up to about five years of age.

7. The products according to claim 1, wherein said toddler is between one and five years of age.

8. The products according to claim 1, wherein said child is between one and four years of age.

9. The products according to claim 1, wherein said infant is up to about one year of age.

10. A method of making a frozen infant food or toddler food product comprising:
    (a) cooking a liquid or puree medium, whereby the medium is rendered substantially sterile;
    (b) stirring the medium for a predetermined period of time by a slow-churned freezing process to form a frozen product, wherein the slow-churning freezing process is conducted at a freezing temperature of at least about −3° C. to at least about −8° C., and wherein the duration of freezing the product is from at least about 50 min to about 60 min; and
    (c) transferring the frozen product into a sterile container.

11. The method according to claim 10, wherein the medium is selected from the list consisting of fruits, vegetables, meats, fish, and any combinations thereof.

12. The method according to claim 10, wherein said product is organic.

13. The method according to claim 10, wherein said product is non-organic.

14. The method according to claim 10, wherein the slow-churning freezing process provides at least about 80-90% freezable water fraction at the temperature from at least about −3° C. to at least about −8° C.

15. The method according to claim 10, wherein said toddler is up to about five years of age.

16. The method according to claim 10, wherein said toddler is between one and five years of age.

17. The method according to claim 10, wherein said child is between one and four years of age.

18. The method according to claim 10, wherein said infant is up to about one year of age.

\* \* \* \* \*